R. STOCK.
SPRING WHEEL.
APPLICATION FILED MAY 27, 1911.
1,014,858.
Patented Jan. 16, 1912.
2 SHEETS—SHEET 1.
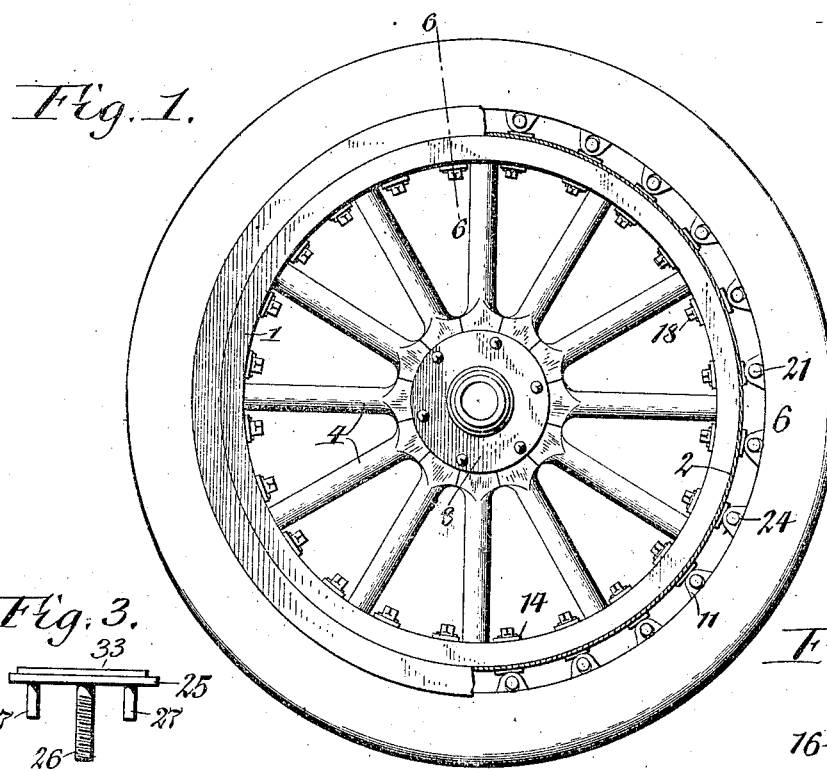
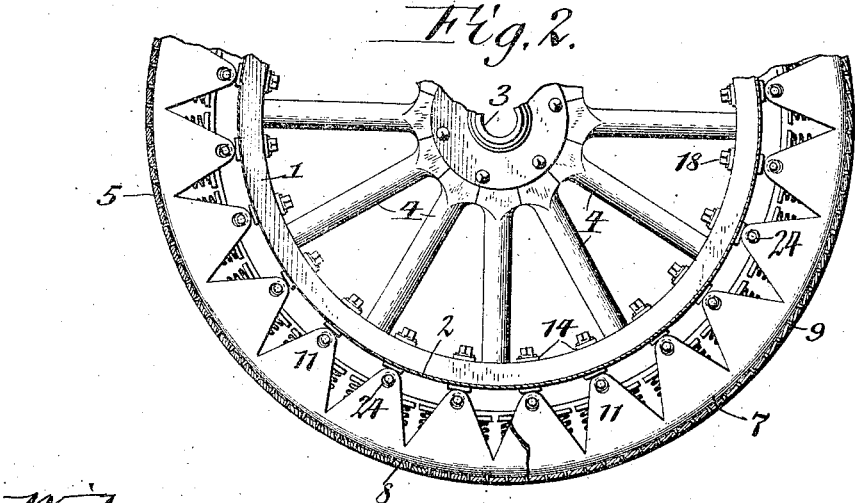
Witnesses:
Richard Sonnier
Leroy S. Hodges.
Inventor
Robert Stock
by Leyper & Popp
Attorneys

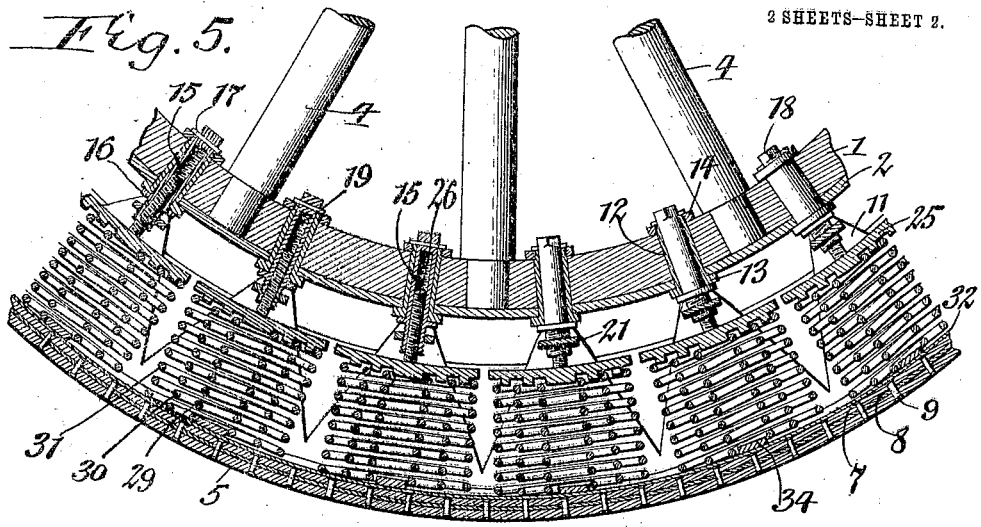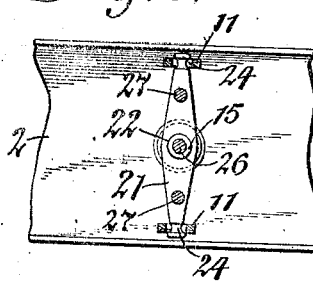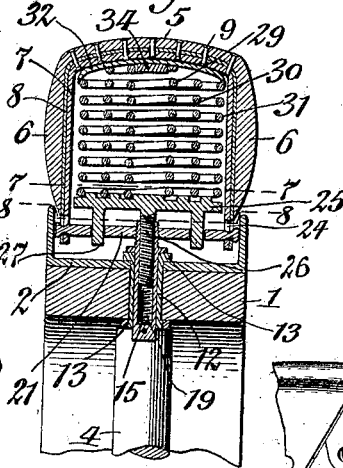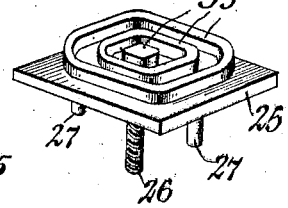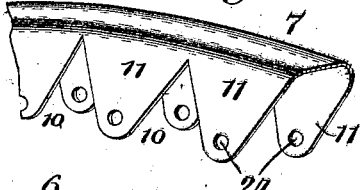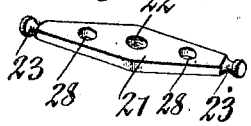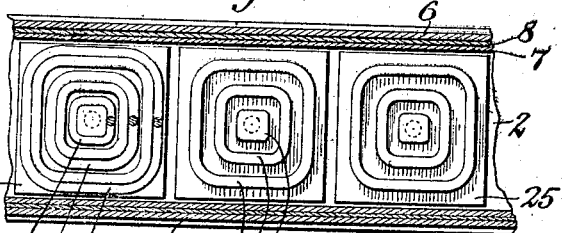

UNITED STATES PATENT OFFICE.

ROBERT STOCK, OF NEW YORK, N. Y.

SPRING-WHEEL.

1,014,858.  Specification of Letters Patent.  Patented Jan. 16, 1912.

Application filed May 27, 1911. Serial No. 629,769.

*To all whom it may concern:*

Be it known that I, ROBERT STOCK, a citizen of the United States, residing at New York, in the county of New York and State of New York, have invented new and useful Improvements in Spring-Wheels, of which the following is a specification.

This invention relates to that class of spring wheels in which the resilient members are mounted between the felly of the wheel and a flexible casing extending circumferentially around the felly.

It is the object of this invention to provide a spring wheel of this character which can be constructed substantially so as to withstand the wear and tear to which the same is subjected particularly during hard usage, which is capable of being readily adjusted to suit the load designed to be carried by the wheel, and which can be readily dismembered and reassembled when necessary for inspection or repairs.

In the accompanying drawings consisting of 2 sheets: Figure 1 is a side elevation of a spring wheel embodying my improvements showing the rim of the wheel partly broken away. Fig. 2 is a similar view showing the outermost layer or sheathing of the tire casing broken away. Fig. 3 is a detached side elevation of one of the followers of the spring adjusting mechanism. Fig. 4 is a detached side elevation of one of the tubular adjusting screws of the spring adjusting mechanism. Fig. 5 is a fragmentary longitudinal section, on an enlarged scale, of the felly, tire casing and associated parts. Fig. 6 is a vertical cross section, on an enlarged scale, in line 6—6, Fig. 1. Figs. 7 and 8 are fragmentary horizontal sections in the correspondingly numbered lines in Fig. 6. Fig. 9 is a perspective view of one of the spring adjusting followers. Fig. 10 is a similar view of one of the inner members of the casing. Fig. 11 is a similar view of one of the inner adjusters or yokes of the tire casing.

Similar numerals of reference indicate corresponding parts throughout the several views.

The wheel which is shown in the drawings for illustrating the application of my invention comprises a wooden felly 1, a channel-shaped rim 2 secured to the outer side of the felly, a hub 3 and radial spokes 4 connecting the hub and felly. Although this construction is preferred the same may be varied, if desired.

The tire casing as a whole is constructed generally or U-shape in cross-section forming an outer side or tread and two lateral sides and the same is so mounted relatively to the wheel rim that the channel of the casing faces inwardly or toward the channel of the wheel rim. In its preferred form the casing comprises an outer layer or sheathing of flexible fibrous non-metallic material, such as leather or rubber, having a continuous peripheral or tread portion 5 and two side or radial portions 6 which are continuous circumferentially and are arranged at their inner edges within the radial flanges of the wheel rim. On its inner side the sheathing is provided with a U-shaped tension lining which coöperates with other parts for securing the sheathing to the wheel rim and felly. This tension lining consists preferably of an inner layer 7 of canvas or similar fibrous flexible fabric and an outer layer 8 of metal, preferably thin sheet metal, which is interposed between the outer side of the canvas layer and the inner side of the leather or rubber sheathing. The tread portion of the tension lining may be secured to the sheathing in any suitable way, for instance by means of rivets 9, as shown in Figs. 5 and 6, while the side portions of the lining may be secured to the side portions of the sheathing by cement or vulcanization. The tread portion of the tension lining is preferably continuous but the radial or side portions thereof are cut out at intervals so as to form V-shaped notches 10 and V-shaped tabs 11 which alternate with said notches. The inner ends of these tabs are connected with adjusting devices which will be presently described and the notches between the same permit the lining to be pressed inwardly under the load and to expand when relieved from the load without liability of cramping or buckling the same.

The means whereby the casing of the tire is held in place and adjusted radially are constructed as follows: 12 represents a plurality of tubular bearings which are arranged equidistant around the wheel felly and rim and each of which is seated radially in co-inciding openings formed in the web of the wheel rim and the felly and provided at its outer end with a collar 13 forming a shoulder which bears against the outer side of the wheel rim and at its inner end with a collar 14 forming a shoulder which bears against the inner side of the felly. The outer collar 13 is preferably formed integrally on the bearing sleeve while the inner collar 14 is preferably constructed in the form of a screw nut which engages with the externally threaded inner end of the tubular bearing. In each of these tubular bearings is journaled a tubular adjusting screw 15 which is capable of rotation in the bearing but held against axial or lengthwise movement therein. For this purpose the tubular adjusting screw is preferably provided near its outer end with a collar 16 forming a shoulder which bears against the outer end of its tubular bearing and near its inner end the same is provided with a transverse pin 17 forming a shoulder which bears against the inner end of the tubular bearing. Turning of the tubular adjusting screw may be effected in various ways but preferably by constructing the inner end 18 of the same of flat sided form so as to permit of applying a wrench or other hand tool thereto. The tubular adjusting screw is provided with an internal screw thread 19 and the inner end of the same is provided on its periphery with an external screw thread 20.

21 represents a plurality of inner adjusting bars or yokes which are arranged transversely in an annular row within the channel-shaped wheel rim and each of which is provided centrally with an internally screw threaded opening 22 which receives the external thread on one of the tubular adjusting screws 15 while the opposite ends of each yoke are provided with annular grooves 23 forming reduced necks on the yoke which engage with openings or perforations 24 at the inner ends of a corresponding pair of tabs of the casing lining.

25 represents a plurality of outer adjusting members or followers which are arranged in an annular row within the inner part of the tire casing and each of which is constructed in the form of a plate which is provided centrally on its inner side with an inwardly projecting externally threaded adjusting shank or stem 26 which engages with the internal screw thread of one of the tubular adjusting screws, and on opposite sides of the adjusting stem with two inwardly projecting guide pins 27 which slide radially in openings 28 formed in the companion inner adjusting bar on opposite sides of its central opening. The screw connections between the adjusting screw 15 and the inner and outer adjusting members 21, 25 are so constructed that upon turning the adjusting screw in one direction the inner and outer adjusters 21, 25 will be separated, in other words, the inner adjuster 21 is moved inwardly and the outer adjuster 25 outwardly, while upon turning the adjusting screw in the opposite direction the adjusters will be moved toward each other.

In the space between the adjusters and the tread of the tire casing is arranged a plurality of sets of spiral springs each set consisting preferably of a plurality of coil springs 29, 30, 31 which are of different diameters and are nested or arranged concentrically one within the other. The inner ends of each nest of springs bear against the outer sides of one of the outer adjusters 25 while the outer ends of each set of springs bear against a supporting ring 32 arranged on the inner side of the tread of the casing and preferably constructed of spring steel. The inner ends of each nest or set of springs are preferably held against displacement relatively to each other by means of a plurality of concentric centering projections, ribs or flanges 33 formed on the outer side of each outer adjuster and forming a plurality of concentric seats in which the inner ends of the springs of each set rest. The outer ends of the springs of each set are held against lateral displacement within the tire casing by means of a centering lug or projection 34 secured centrally to the inner side of the supporting ring and engaging within the bore of the central spring of the respective set. For the purpose of increasing the supporting area of the several springs the members of each set are preferably wound into substantially rectangular form, as shown in Fig. 7, thereby permitting of employing a larger amount of stock in each set of springs and also supporting the tire casing more uniformly over its entire tread.

For the purpose of increasing the resisting capacity or stiffening the several springs of the wheel so as to enable the same to sustain a greater load the several adjusting screws 15 are turned in the proper direction for separating each pair of inner and outer adjusters, thereby causing the tire casing to be drawn inwardly and the springs to be pushed outwardly, whereby the tension upon these springs is increased and the wheel is caused to ride harder for use in transporting heavy loads. Upon turning each adjusting screw in the opposite direction the pair of inner and outer adjusters associated with this adjusting screw are caused to approach each other, whereby the springs are permitted to expand and the tire casing is permitted to move outwardly, thereby reducing the tension on the springs so that they are softer and better adapted for carrying light loads. My improved spring wheel is thus capable of being readily adapted for the particular service to which the wheel is to be put without necessitating manufacturing a variety of sizes to meet difference requirements. Furthermore, the appearance of this wheel closely resembles the usual pneumatic tire and it is capable of being applied to wheels as now ordinarily constructed. Moreover, the internal parts of this spring wheel are fully protected against dust, dirt and moisture so that the same is not liable to wear unduly or become inoperative by rusting.

I claim as my invention:

1. A spring wheel comprising a felly, a tire casing arranged around the felly, springs engaging with the inner side of the tire casing, and adjusting devices constructed to draw the casing inwardly and press the springs outwardly or vice versa comprising a follower bearing against the inner ends of said springs and provided with an inwardly projecting screw stem, an adjusting screw journaled on the felly and having an internal screw thread which engages with said stem, and a yoke connected with said casing and having an internally screw threaded opening which engages with an external screw thread on the adjusting screw.

2. A spring wheel comprising a felly, a tire casing arranged around the felly, springs engaging with the inner side of the tire casing, and adjusting devices constructed to draw the casing inwardly and press the springs outwardly or vice versa comprising a follower bearing against the inner ends of said springs and provided with an inwardly projecting screw stem and two inwardly projecting guide pins on opposite sides of said stem, a yoke connected at opposite ends with said casing provided centrally with a screw threaded opening and on opposite sides of its center with guide openings which receive said guide pins, and an adjusting screw journaled on the felly and having an internal screw thread which engages with said stem and an external screw thread which engages with said central opening of the yoke.

Witness my hand this 24th day of May, 1911.

ROBERT STOCK.

Witnesses:
 EDWARD D. DEVLIN,
 R. B. STAFFORD.